March 21, 1950
G. G. GIBBS
2,501,386
PORTABLE POWER TRANSMITTING UNIT
AND CHANGEABLE TOOLHOLDER
Filed Nov. 13, 1947
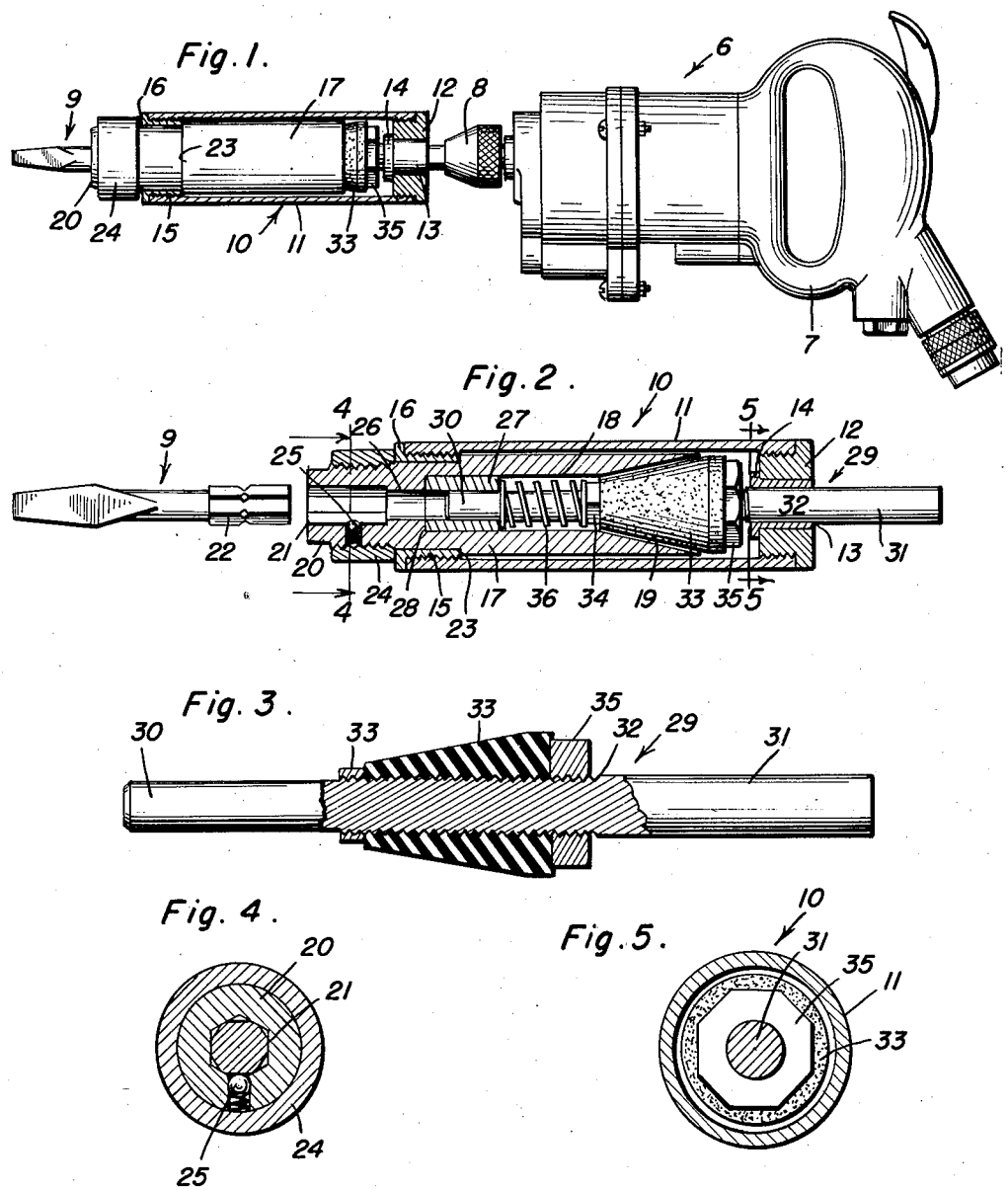
Inventor
George Gordon Gibbs
By *Clarence A. O'Brien
and Harvey B. Jacobson*
Attorneys Patented Mar. 21, 1950

2,501,386

UNITED STATES PATENT OFFICE 2,501,386

PORTABLE POWER TRANSMITTING UNIT AND CHANGEABLE TOOLHOLDER

George Gordon Gibbs, Santa Monica, Calif.

Application November 13, 1947, Serial No. 785,752

3 Claims. (Cl. 81—52)

The present invention relates to a portable hand-type power transmitting unit or device which is, in itself, a tool and, in addition, a tool holder for changeable tools such as screw drivers, wrenches, cutter heads and the like; it being the primary object of the invention to generally, structurally and otherwise improve upon units, in the same field of invention of types known to me.

More specifically, the invention appertains to an instrumentality in the form of a structural unit for powering commonly used hand tools, the source of power being any electric, pneumatic or other revolving hand-drill motor having a chuck to accommodate the shaft or spindle portion of said powering unit.

It is evident from the description so far provided that I am sufficiently conversant with converter-type units of the forms under advisement to appreciate that there are no new broad principles involved in my unit and that the objects and advantages have to do with structural refinements and improvements which coordinate to provide an adequate and satisfactory unit for adaptable and time saving use by mechanics, carpenters, cabinet makers, boat builders and other workmen in a position to use this converter-type power transmission unit in conjunction with a chuck equipped manually employable motor.

In carrying out the specific principles of the instant invention, I have evolved and produced a simple and practical adaptation of parts characterized by a case forming a handle, a spindle-like shaft mounted for rotation in one end of the case with an end portion projecting for co-action with a motorized chuck, and with the inner end portion projecting into the case and telescoping into a driven sleeve, the shaft and sleeve having co-acting clutch parts which are normally spring separated and the outer end of the sleeve, beyond the corresponding end of said case, having socket means to accommodate detachable and selectively usable tools such as screw drivers, drills and the like.

Other objects, features and advantages will become more readily apparent from the following description and the accompanying illustrative drawings.

In the drawings, wherein like numerals are employed to designate like parts throughout the views:

Figure 1 is an elevational view of a motor showing the improved portable power transmitting tool holder unit coupled thereto, the handle portion of the unit being in section;

Figure 2 is a view in section and elevation, on a larger scale showing the unit by itself with a screw driver about to be placed in the adapter socket;

Figure 3 is a view partly in section and partly in elevation of the spindle means;

Figures 4 and 5 are cross-sections on the lines 4—4 and 5—5 respectively of Figure 2, looking in the directions of the indicating arrows.

Referring now to the drawings, and first to Figure 1, it will be seen that the manual-type motor, which is conventional, is denoted by the numeral 6 and embodies the usual trigger-equipped hand-grip 7. The motorized shaft thereof is provided with a suitable chuck 8. One of the tools which is adapted to be powered and driven is denoted by the numeral 9 and the power transmitting unit, which is employed between the chuck and tool for driving the tool, is denoted, in a unitary sense, by the numeral 10. I do not claim the source of power 6 or the tool 9 but merely the means 10.

Considering in detail the parts and mechanical association thereof, the case is made up primarily of a cylindrical barrel 11 which constitutes a handle. While this is open-ended and equal in diameter from end to end, it may be of some other shape, obviously. At the drive end, the barrel is internally screw-threaded to accommodate the screw plug portion of a plastic cap 12. This is centrally bored to accommodate a bronze bushing 13 having an assembling and retaining flange 14 bearing against the inner end of the plug and on the interior of the handle, said bushing being appropriately pressed into place. The opposite or forward end of the barrel is also internally screw-threaded to accommodate a bearing sleeve 15 with an exposed abutment flange 16. The tool holder, which is the driven member, comprises a tubular shaft 17 whose body portion is confined within the handle, the right-hand bore 18 thereof being enlarged and tapered as at 19 to provide a conical socket which serves as a female clutch surface. The projecting end portion of the driven shaft 17 is fashioned into a suitable nose as at 20, and this has a polygonal socket 21 constituting an adapter for the correspondingly shaped shank portion 22 of one of the tools (tool 9 for example), which in practice, will be used. This reduced portion provides a shoulder as at 23 which engages the shoulder provided by the bearing sleeve 15. The socketed adapter portion is externally screw-threaded to accommodate a ring-nut 24 which serves as an assembling shoulder and co-acts with the flange 16 and also serves to hold in place a spring which, in turn, operates on a ball detent 25 projecting into the socket to hold the shank portions of the various tools in place. The restricted bore 26 opens from the inner end of the socket into the enlarged adjacent end portion of the main bore 18. In fact, it communicates with a small bushing 27 which is fitted into said bore 18 and comes against the stop shoulder 28 provided, as shown.

I next call attention to the spindle means denoted by the numeral 29. The spindle or shaft proper 30 has its inner reduced end piloting into the bushing 27. The opposite end is enlarged, as at 31, and this projects through and beyond the bronze bushing 13 where it is available for operable association with the chuck 8. The intermediate portion is of the same diameter as end 31 and is screw-threaded, as at 32, to accommodate a conical clutch element 33, this being the male clutch part which projects into the female clutch part 19. This clutch element 33 is of appropriate composition material, as required in the trade, is threadedly mounted on the threaded portion 32 and is held in adjusted position by the retaining nuts 34 and 35, all as shown in Figure 3 of the drawings. The means 29 is assembled in the case in such a way that the clutch part 33 fits into the clutch part 19 and so that the pilot end 30 projects through the bore 18 and is lodged for rotation in the stabilizing and stress distributing bushing 27. A coiled spring 36, a clutch release spring, surrounds the pilot end of the spindle and bears at one end against the bushing 27 and at its opposite end against the nut 34. This is an expansion spring and its tendency and purpose is to normally disengage the cone clutch element 33 from the co-acting clutch part 19.

The inventive thought in or for this tool is not the embodiment of a new principle, but the novel application of a unit mechanizing commonly-used hand tools; thus, a time saver for the mechanic, carpenter, cabinet maker, boat builder, or other assembler. In comparison, the cost of this accessory tool would be but a fraction of that, of any one of the (complete power units) performing similar functions, now offered the public.

The shank of the bit (wrench or screw driver), is hexagonal in shape, or by other means is keyed "snap-on type" receptacle which, in turn, is fixed on a shaft with the driven portion of a clutch. The shaft extended from the drive side of the clutch is held by the drill motor chuck. Clutch faces are separated by a coil compression spring, providing a positive "on and off" position of the bit; which is not in motion although the motor may be; until actuated by a thrust, exerted by the operator. Clutch members are supported in a tubular case or barrel, the end caps of which act as retainers for the necessary radial and thrust bearings and oil seals; and said case is also the tool handle, by which it is located and steadied to the work.

The unit herein shown and described is not necessarily restricted to use in connection with the motor means 6 but may also be used in a lathe or drill press for tapping with greater assurance against breaking the tap while under power.

Reference being had again to the spindle forming shaft 30 it is to be pointed out that the right end portion 31 and the screw threaded portion are the same in outside diameter. On the other hand the left end 30, as explained, is slightly smaller in outside diameter than the threads and consequently the same degree smaller than the right hand end portion. I desire to point out that in manufacture it may be more desirable, and it would be satisfactory, if the ends 30 and 31 were of the same diameter, that is precisely the same but of a diameter slightly less than the outside diameter of the threads. I desire the description and claims to be comprehended accordingly.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

Having described the invention, what is claimed as new is:

1. In a portable manually usable power transmitting clutch construction of the type shown, a cylindrical barrel having a bearing at its forward end, a tubular driven shaft having its major portion confined and turnable in said barrel, the inner confined end of said shaft having a conical female clutch member, the outer end of said shaft being reduced in cross-section and extending through and beyond the forward end of said barrel and terminating in a driven power take-off member, the latter member being externally screw-threaded, a ring nut surrounding said member and screwed in place thereon, said ring nut being outwardly of the forward end of the barrel and co-acting with said forward end and providing an assembling and stop shoulder, bearing means removably mounted in the rearward end of said barrel, a drive shaft journaled for rotation intermediate its ends in said bearing means, one end projecting outwardly and beyond the bearing means for coupling same to a chuck on an electric motor, the other, the inner end, projecting into the bore of said tubular shaft, a conical clutch member adjustably mounted on the intermediate portion of said drive shaft and confined in said barrel and fitting into the female clutch member, a bushing fitted into the bore of said tubular shaft, the adjacent piloting end of said drive shaft being mounted for rotation in said bushing, and a coiled clutch release spring surrounding the shaft within the bore of said tubular shaft and serving to exert endwise pressure on said drive shaft and normally disengage said clutch members.

2. A portable power transmitting clutch adapted to be held in the user's hand and usable in deriving power from an electric motor chuck and delivering it to power take-off means comprising a cylindrical open-ended barrel screw-threaded at opposite ends, a screw-threaded bearing sleeve threaded into one screw-threaded end of the barrel and providing an internal assembling shoulder within said barrel, a tubular driven shaft having one end reduced and providing a journal and a shoulder adjacent said journal, said journal being mounted for rotation in said bearing sleeve and said shoulder abutting the first named shoulder, an end portion of the journal projecting beyond said sleeve and provided with power take-off means, the latter being externally screw-threaded, a ring nut on said externally screw-threaded portion, said ring nut abutting said sleeve and serving to assemble the driven shaft in said barrel, the inner end portion of said driven shaft having a conical socket providing a female clutch element, a plug bearing screwed into the open end of said barrel, a driven shaft having a portion journaled for rotation in said plug bearing and projecting beyond the plug bearing to accommodate the aforementioned chuck, the inner end of said driven shaft being reduced and telescoping into the bore of said driven shaft, a bushing fitted in the bore of said driven shaft, one end of said drive shaft being rotatable in said bushing, a conical clutch element removably and adjustably mounted on the intermediate portion of said drive shaft and situated within the confines of said barrel and fitting into said female clutch element, and a coiled spring surrounding the inner end of said drive shaft and bearing at one end against said bushing and at its opposite end against said conical clutch element.

3. As a new article of manufacture and as a component part of a unit of the class described, a driven shaft comprising a tubular centrally bored body, the inner end of said body being externally shouldered and conically tapered to provide a female clutch surface, the outer end of said shaft being reduced in cross-section, provided with a driven member which is externally screw-threaded, a ring nut on said externally screw-threaded portion, said ring nut constituting an assembling shoulder, a bushing removably mounted in the bore of said tubular shaft, a drive member embodying a spindle-shaft of uniform cross-sectional diameter at one end and enlarged at the opposite end, the intermediate portion of said shaft being screw-threaded, a conical clutch member threadedly adjustable on the screw-threaded portion of said shaft, and nuts also on the screw-threaded portion of said shaft at opposite ends of said clutch member for adjustably holding same in place, whereby an end portion of the drive shaft may be fitted into the bore of the driven shaft and supported in said bore by way of said bushing.

GEORGE GORDON GIBBS.

REFERENCES CITED

The following references are of record in the file of this patent:

UNITED STATES PATENTS

| Number | Name | Date |
| --- | --- | --- |
| 458,408 | Schwanhausser | Aug. 25, 1891 |
| 1,024,151 | Smith | Apr. 23, 1912 |
| 1,102,947 | Nissen | July 7, 1914 |
| 1,447,626 | Partlow | Mar. 6, 1923 |
| 2,161,300 | Kolstad | June 6, 1939 |
| 2,220,354 | Sheetz | Nov. 5, 1940 |

FOREIGN PATENTS

| Number | Country | Date |
| --- | --- | --- |
| 244,218 | Great Britain | Dec. 17, 1925 |
| 451,699 | Germany | Oct. 24, 1927 |
| 474,971 | Germany | Apr. 16, 1929 |